United States Patent
Burton, Jr. et al.

(10) Patent No.: US 8,075,871 B2
(45) Date of Patent: Dec. 13, 2011

(54) METHOD FOR MAKING MOLECULAR SIEVE SSZ-83

(75) Inventors: Allen W. Burton, Jr., Richmond, CA (US); Stacey I. Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 523 days.

(21) Appl. No.: 12/277,916

(22) Filed: Nov. 25, 2008

(65) Prior Publication Data

US 2009/0104112 A1    Apr. 23, 2009

(51) Int. Cl.
   *C01B 39/04*    (2006.01)
(52) U.S. Cl. ........................... 423/706; 423/708
(58) Field of Classification Search .................. 423/706, 423/708
   See application file for complete search history.

(56) References Cited

U.S. PATENT DOCUMENTS

| 4,557,919 | A | * | 12/1985 | Sumitani et al. | 423/708 |
| 4,941,963 | A | * | 7/1990 | Valyocsik | 208/46 |
| 6,027,707 | A | * | 2/2000 | Casci et al. | 423/705 |
| 6,468,485 | B1 | * | 10/2002 | Elomari | 423/213.2 |
| 6,555,089 | B1 | * | 4/2003 | Elomari | 423/706 |
| 7,022,308 | B1 | * | 4/2006 | Yuen et al. | 423/706 |

* cited by examiner

*Primary Examiner* — David M Brunsman
(74) *Attorney, Agent, or Firm* — Michael D. Ross (57) ABSTRACT

The present invention is directed to a method for making a new crystalline molecular sieve designated SSZ-83 using a 1,4-bis(N-butylpiperidinium)butane dication or a 1,4-bis(N-butylpyrrolidinium)butane dication as a structure directing agent.

14 Claims, 8 Drawing Sheets

METHOD FOR MAKING MOLECULAR SIEVE SSZ-83

FIELD OF THE INVENTION

The present invention relates to new molecular sieve SSZ-83, a method for preparing SSZ-83 in a fluoride media using a 1,4-bis(N-butylpiperidinium)butane dication or a 1,4-bis(N-butylpyrrolidinium)butane dication as a structure directing agent ("SDA"), and uses for SSZ-83.

BACKGROUND OF THE INVENTION

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new molecular sieves with desirable properties for gas separation and drying, hydrocarbon and chemical conversions, and other applications. New molecular sieves may contain novel internal pore architectures, providing enhanced selectivities in these processes.

SUMMARY OF THE INVENTION

The present invention is directed to a new family of molecular sieves with unique properties, referred to herein as "molecular sieve SSZ-83" or simply "SSZ-83."

In accordance with the present invention there is provided a molecular sieve having a mole ratio greater than about 20 of (1) an oxide of a first tetravalent element to (2) optionally, an oxide of a trivalent element, pentavalent element, second tetravalent element which is different from the first tetravalent element or a mixture thereof and having, after calcination, the powder X-ray diffraction (XRD) lines of Table 6. It should be noted that the phrase "mole ratio greater than about 20" includes the case where there is no oxide (2), i.e., the mole ratio of oxide (1) to oxide (2) is infinity. In that case the molecular sieve is comprised of essentially all of the oxide of the first tetravalent element.

The present invention also includes a method of preparing a molecular sieve by contacting under crystallization conditions: (1) at least one source of an oxide of a first tetravalent element; (2) optionally, one or more sources of an oxide selected from the group consisting of oxides of a trivalent element, a pentavalent element, a second tetravalent element which is different from the first tetravalent element, and mixtures thereof; (3) fluoride ions; and (4) a SDA dication selected from the group consisting of 1,4-bis(N-butylpiperidinium)butane dications and 1,4-bis(N-butylpyrrolidinium)butane dications.

The present invention also includes a process for preparing a molecular sieve having, after calcination, the powder XRD lines of Table 6, by:

(a) preparing a reaction mixture containing: (1) at least one source of an oxide of a first tetravalent element; (2) optionally, one or more sources of an oxide selected from the group consisting of oxides of a trivalent element, a pentavalent element, a second tetravalent element which is different from the first tetravalent element, and mixtures thereof; (3) fluoride ions; (4) a SDA dication selected from the group consisting of 1,4-bis(N-butylpiperidinium)butane dications and 1,4-bis(N-butylpyrrolidinium)butane dications; and (5) water; and (b) maintaining the reaction mixture under conditions sufficient to form crystals of the molecular sieve.

Where the molecular sieve formed is an intermediate material, the process of the present invention includes a further post-synthesis processing in order to achieve the target molecular sieve (e.g. by post-synthesis heteroatom lattice substitution or acid leaching).

The present invention also provides SSZ-83 having a composition, as-synthesized and in the anhydrous state, in terms of mole ratios, as follows:

|  | Broadest | Preferred |
|---|---|---|
| $YO_2/W_cO_d$ | 20-∞ | 30-∞ |
| $Q/YO_2$ | 0.015-0.06 | 0.025-0.06 | wherein:

(1) Y is selected from the group consisting of tetravalent elements from Groups 4-14 of the Periodic Table, and mixtures thereof;

(2) W is selected from the group consisting of trivalent, pentavalent and tetravalent elements from Groups 3-13 of the Periodic Table, and mixtures thereof;

(3) stoichiometric variable c is 1 or 2, and d is 2 when c is 1 (i.e., W is tetravalent) or d is 3 or 5 when c is 2 (i.e., d is 3 when W is trivalent or 5 when W is pentavalent); and (4) Q is a SDA dication selected from the group consisting of 1,4-bis(N-butylpiperidinium)butane dications and 1,4-bis(N-butylpyrrolidinium)butane dications.

DETAILED DESCRIPTION OF THE INVENTION

Introduction

The term "active source" means a reagent or precursor material capable of supplying an element in a form that can react and be incorporated into the molecular sieve structure. The terms "source" and "active source" are used interchangeably herein.

The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985).

The term "molecular sieve" includes (a) intermediate and (b) final or target molecular sieves and molecular sieves pro- duced by (1) direct synthesis or (2) post-crystallization treatment (secondary synthesis). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433 to C. Y. Chen and Stacey Zones, issued Sep. 14, 2004.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants, are intended to be non-limiting, such that recitation of items in a list is not to the exclusion of other like items that may also be useful in the materials, compositions and methods of this invention.

The present invention is directed to a molecular sieve designated herein as "molecular sieve SSZ-83" or simply "SSZ-83."

In preparing SSZ-83, a 1,4-bis(N-butylpiperidinium)butane dication or a 1,4-bis(N-butylpyrrolidinium)butane dication is used as a structure directing agent ("SDA"), also known as a crystallization template. The SDAs useful for making SSZ-83 are represented by the following structures (1) and (2):

(1)

1,4-bis(N-butylpiperidinium)butane dication (2)

1,4-bis(N-butylpyrrolidinium)butane dication

Reaction Mixture

In general, SSZ-83 is prepared by:

(a) preparing a reaction mixture containing: (1) at least one source of an oxide of a first tetravalent element; (2) optionally, one or more sources of an oxide selected from the group consisting of oxides of a trivalent element, a pentavalent element, a second tetravalent element which is different from the first tetravalent element, and mixtures thereof; (3) fluoride ions; (4) a SDA dication selected from the group consisting of 1,4-bis(N-butylpiperidinium)butane dications and 1,4-bis(N-butylpyrrolidinium)butane dications; and (5) water; and (b) maintaining the reaction mixture under conditions sufficient to form crystals of the molecular sieve.

Where the molecular sieve formed is an intermediate material, the process of the present invention includes a further step of synthesizing a target molecular sieve by post-synthesis techniques, such as heteroatom lattice substitution techniques and acid leaching.

The composition of the reaction mixture from which the molecular sieve is formed, in terms of molar ratios, is identified in Table 1 below:

TABLE 1

| Reactants | Broad | Preferred |
|---|---|---|
| $YO_2/W_aO_b$ molar ratio | 20-∞ | 30-∞ |
| $Q/YO_2$ molar ratio | 0.1-1.0 | 0.15-0.30 |
| $F/YO_2$ molar ratio | 0.2-1.5 | 0.3-0.6 |
| $H_2O/YO_2$ molar ratio | 1-7 | 2-4 | wherein:

(a) compositional variables Y, W and Q are as described herein above; and (b) a is 1 or 2, and b is 2 when a is 1 (i.e., W is tetravalent) or b is 3 or 5 when a is 2 (i.e., b is 3 when W is trivalent or 5 when W is pentavalent).

In a subembodiment, the composition of the reaction mixture from which SSZ-83 is formed, in terms of molar ratios, is identified in Table 2 below, wherein composition variable Q is as described herein above.

TABLE 2

| Reactants | Broad | Preferred |
|---|---|---|
| $SiO_2/Al_2O_3$ molar ratio | 20-∞ | 30-∞ |
| $Q/SiO_2$ molar ratio | 0.1-1.0 | 0.15-0.30 |
| $F/SiO_2$ molar ratio | 0.2-1.5 | 0.3-0.6 |
| $H_2O/SiO_2$ molar ratio | 1-7 | 2-4 |

As noted above, for each embodiment described herein, Y is selected from the group consisting of elements from Groups 4-14 of the Periodic Table. In one subembodiment, Y is selected from the group consisting of germanium (Ge), silicon (Si), and mixtures thereof. In another subembodiment, Y is Si. In one subembodiment, Y is Si. Sources of elements selected for composition variable Y and the second tetravalent element (represented by composition variable W) include oxides, hydroxides, acetates, oxalates, ammonium salts and sulfates of the element(s) selected for Y and W. In one subembodiment, each active source(s) of the element(s) selected for composition variable Y and W is an oxide. Where Y is Si, sources useful herein for Si include fumed silica, precipitated silicates, silica hydrogel, silicic acid, colloidal silica, tetraalkyl orthosilicates (e.g. tetraethyl orthosilicate), and silica hydroxides.

For each embodiment described herein, W is selected from the group consisting of elements from Groups 3-13 of the Periodic Table. In one subembodiment, W is selected from the group consisting of germanium (Ge), gallium (Ga), aluminum (Al), iron (Fe), boron (B), titanium (Ti), indium (In), and mixtures thereof. In another subembodiment, W is Al in combination with one of Ga, Al, Fe, B, Ti and In. In another subembodiment, W is selected from the group consisting of Ge, Al, B, Fe, Ga, and mixtures thereof. In another subembodiment, W is Al. Sources of elements selected for optional composition variable W include oxides, hydroxides, acetates, oxalates, ammonium salts and sulfates of the element(s) selected for W. Sources useful herein for Ge include germanium oxide and germanium ethoxide. Typical sources of aluminum oxide include aluminates, alumina, and aluminum compounds such as $AlCl_3$, $Al_2(SO_4)_3$, aluminum hydroxide ($Al(OH)_3$), kaolin clays, and other zeolites. An example of the source of aluminum oxide is LZ-210 zeolite (a type of Y zeolite). Germanium, boron, gallium, titanium and iron can be added in forms corresponding to their aluminum and silicon counterparts.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein may vary with the nature of the reaction mixture and the synthesis conditions.

Crystallization and Post-Synthesis Treatment

In practice, the molecular sieve is prepared by:

(a) preparing a reaction mixture as described herein above; and (b) maintaining the reaction mixture under crystallization conditions sufficient to form the molecular sieve.

The reaction mixture is maintained at an elevated temperature until the molecular sieve is formed. The hydrothermal crystallization is usually conducted under pressure, and usually in an autoclave so that the reaction mixture is subject to autogenous pressure, at a temperature between 125° C. and 200° C.

The reaction mixture may be subjected to mild stirring or agitation during the crystallization step. It will be understood by a person skilled in the art that the molecular sieves described herein may contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source for compositional variable Y used in the reaction mixture.

Once the molecular sieve has formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the molecular sieve. The SDA can also be removed by photolysis techniques (e.g. exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327 to Navrotsky and Parikh, issued Nov. 1, 2005.

The molecular sieve can subsequently be calcined in steam, air or inert gas at temperatures ranging from about 200° C. to about 800° C. for periods of time ranging from 1 to 48 hours, or more. Usually, it is desirable to remove the extra-framework cation (e.g. $H^+$) by ion-exchange or other known method and replace it with hydrogen, ammonium, or any desired metal-ion.

Where the molecular sieve formed is an intermediate material, the target molecular sieve can be achieved using post-synthesis techniques such as heteroatom lattice substitution techniques. The target molecular sieve can also be achieved by removing heteroatoms from the lattice by known techniques such as acid leaching.

The molecular sieve made from the process of the present invention can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or, dried or partially dried and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa.

SSZ-83 is useful in catalysts for a variety of hydrocarbon conversion reactions such as hydrocracking, dewaxing, olefin isomerization, alkylation of aromatic compounds and the like. SSZ-83 is also useful as an adsorbent for separations.

Characterization of the Molecular Sieve

Molecular sieves made by the process of the present invention have a composition, as-synthesized and in the anhydrous state, as described in Table 3 (in terms of mole ratios), wherein compositional variables Y, W and Q and stoichiometric variables c and d are as described herein above.

TABLE 3

|  | Broadest | Preferred |
|---|---|---|
| $YO_2/W_cO_d$ | 20-∞ | 30-∞ |
| $Q/YO_2$ | 0.015-0.06 | 0.025-0.06 |

In one subembodiment, the molecular sieves made by the process of the present invention have a composition, as-synthesized and in the anhydrous state, as described in Table 4 (in terms of mole ratios), wherein Q is as described herein above.

TABLE 4

|  | Broadest | Preferred |
|---|---|---|
| $SiO_2/Al_2O_3$ | 20-∞ | 30-∞ |
| $Q/SiO_2$ | 0.015-0.06 | 0.025-0.06 |

Molecular sieves synthesized by the process of the present invention are characterized by their XRD pattern. The powder XRD pattern lines of Table 5 are representative of as-synthesized SSZ-83 made in accordance with this invention. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Y/W mole ratio from sample to sample. Calcination can also cause minor shifts in the XRD pattern. Notwithstanding these minor perturbations, the basic crystal lattice structure remains unchanged.

TABLE 5

Characteristic Peaks for As-Synthesized SSZ-83

| 2 Theta[a] | d-spacing (Angstroms) | Relative Absolute Intensity (%)[b] |
|---|---|---|
| 7.87 | 11.22 | VS |
| 8.66 | 10.20 | M |
| 19.41 | 4.57 | W |
| 21.43 | 4.14 | M |
| 21.99 | 4.04 | S |
| 22.90 | 3.88 | VS |
| 26.46 | 3.37 | W |
| 28.86 | 3.09 | W |
| 31.98 | 2.80 | W |

[a] ±0.20
[b] The powder XRD patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

The X-ray diffraction pattern lines of Table 6 are representative of calcined SSZ-83 made in accordance with this invention.

TABLE 6

Characteristic Peaks for Calcined SSZ-83

| 2 Theta[a] | d-spacing (Angstroms) | Relative Absolute Intensity (%)[b] |
|---|---|---|
| 7.90 | 11.18 | VS |
| 8.69 | 10.17 | M |
| 15.74 | 5.63 | W |
| 19.26 | 4.61 | W |
| 21.46 | 4.14 | M |
| 22.14 | 4.01 | M |
| 22.89 | 3.88 | VS |
| 26.34 | 3.38 | W |
| 29.01 | 3.08 | W |

[a] ±0.20
[b] The powder XRD patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

The powder X-ray diffraction patterns presented herein were collected by standard techniques. The radiation was CuK-α radiation. The peak heights and the positions, as a function of 2θ where θ is the Bragg angle, were read from the relative intensities of the peaks (adjusting for background), and d, the interplanar spacing in Angstroms corresponding to the recorded lines, can be calculated.

EXAMPLES

The following examples demonstrate but do not limit the present invention.

Example 1

Synthesis of 1,4-bis(N-butylpiperidinium)butane Dication

A) Synthesis of N-butylpipieridine 45.0 g piperidine (0.53 mol) was added to 150 g ethyl ether. 48.6 g iodobutane (0.26 mol) was then added drop wise. After 3 days the resulting piperidine hydroiodide salt was removed by filtration and the N-butylpiperidine was recovered from the ether solution.

B) Synthesis of 1,4-bis(N-butylpiperidinium)butane Dication 15.0 g 1,4-dibromobutane and 29.4 g N-butylpiperidine were added to 50 mL ethanol. The reaction mixture was then placed in a Teflon cup, capped, and sealed within an 125 mL steel Parr autoclave. The autoclave was then heated at 90° C. for 2 days. The autoclave was then removed and allowed to cool to room temperature. The ethanol was then removed by rotoevaporation and the residues were then recrystallized from hot isopropanol with a minimum of methanol. The recrystallized product was then recovered by vacuum filtration. 21.7 g of the dibromide product was then hydroxide-exchanged by dissolving in water, adding to a 2-fold excess of AG-1-X8 hydroxide anion-exchange resin (Bio-Rad Laboratories, Inc.) and allowing the ion-exchange to occur overnight. The solution was then recovered and titrated with 0.1 N HCl to determine the hydroxide concentration.

Synthesis of SSZ-83 Using
1,4-bis(N-butylpiperidinium)butane Dication

Example 2

6.27 g of a hydroxide solution of 1,4-bis(N-butylpiperidinium)butane ([OH$^-$]=0.52 mmol/g) were added to 1.35 g tetraethylorthosilicate (TEOS) in a tared Teflon container. The open Teflon container was then placed within a vented hood in order to allow the TEOS to hydrolyze and to allow the water and the resulting ethanol to evaporate.

After 5-7 days, the $H_2O/SiO_2$ ratio of the gel was then adjusted to 3.5 with the addition of the necessary quantity of water and then 0.13 g 50% HF was mixed into the gel. The Teflon liner was then capped and sealed within an 23 mL steel Parr autoclave. The autoclave was placed on a spit within a convection oven at 150° C. The autoclave was tumbled at 43 rpm over the course of 32 days in the heated oven. The autoclave was then removed and allowed to cool to room temperature. The solids were then recovered by filtration and washed thoroughly with deionized water (>250 mL). The solids were allowed to dry overnight at room temperature.

Figure 1:
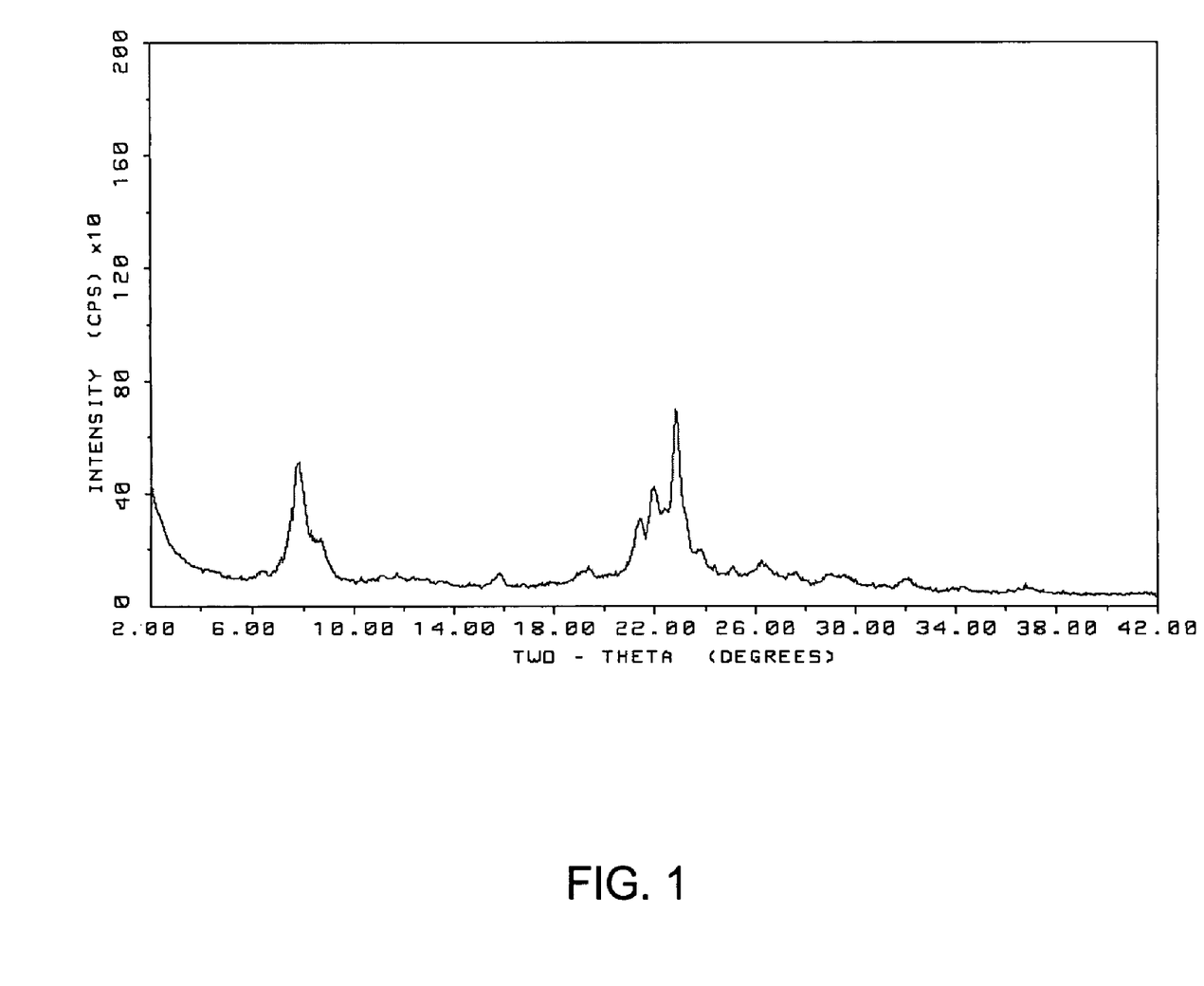
FIG. 1 shows the results of powder XRD analysis of the as-synthesized and calcined molecular sieve prepared in Example 2.
Figure 2:
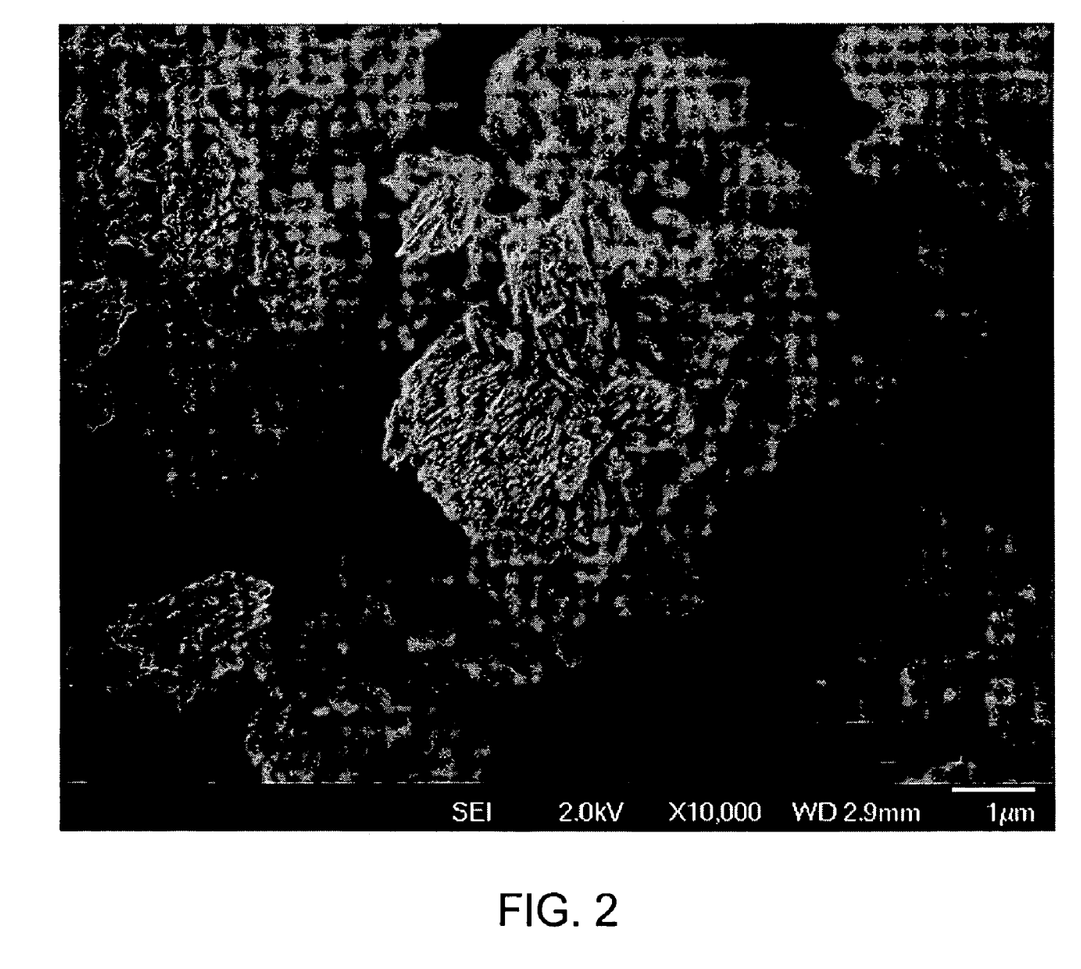
FIG. 2 shows the results of a scanning electron microscopy (SEM) analysis of the molecular sieve prepared in Example 2.
Figure 3:
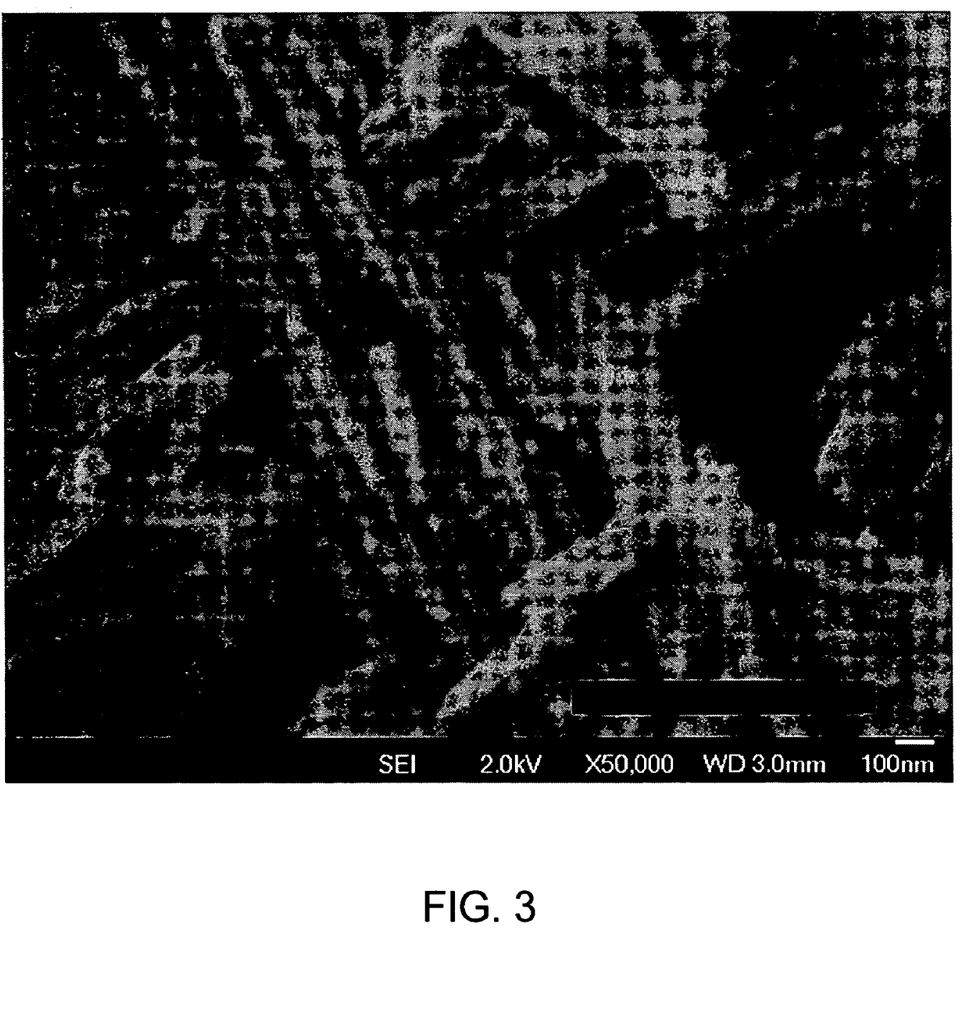
FIG. 3 also shows the results of SEM analysis of the molecular sieve prepared in Example 2.

The resulting product was analyzed by powder XRD and SEM. FIG. 1 shows the powder XRD pattern of the product of this Example. FIGS. 2 and 3 show SEM images of the product.

Example 3

Example 2 was repeated except 0.02 g of seeds from that example were added to the synthesis and the synthesis was heated at 170° C. for 8 days. The resulting product was analyzed by powder XRD, which showed the product to be SSZ-83.

Example 4

Example 2 was repeated except 0.02 g seeds from that example were added to the synthesis, and the final $H_2O/SiO_2$ was adjusted to 1.75 instead of 3.5. The reaction was allowed to proceed for 11 days at 150° C. The resulting product was analyzed by powder XRD. The powder XRD pattern was similar to the pattern obtained by XRD analysis of the product molecular sieve of Example 2, except most peaks were broader than the peaks obtained in Example 2.

Example 5

Example 2 was repeated except the final $F/SiO_2$ was increased to 1.0 by adding ammonium fluoride to the gel. The reaction was allowed to proceed for 6 days. The resulting product was analyzed by powder XRD, which showed the product to be SSZ-83.

Example 6

6.27 g of a hydroxide solution of 1,4-bis(N-butylpiperidinium)butane ($[OH^-]$=0.52 mmol/g) were added to 1.35 g tetraethylorthosilicate (TEOS) in a tared Teflon container. The Teflon container was then capped, sealed, and placed within an 23-mL steel Parr autolcave. The autoclave was allowed to remain at room temperature overnight during which time the TEOS was allowed to hydrolyze. The Teflon cup was then removed from the autoclave and 0.13 g 50% HF was added and mixed to create a white viscous gel. The open Teflon container was then placed within a vented hood in order to allow the ethanol and water to evaporate.

Figure 4:
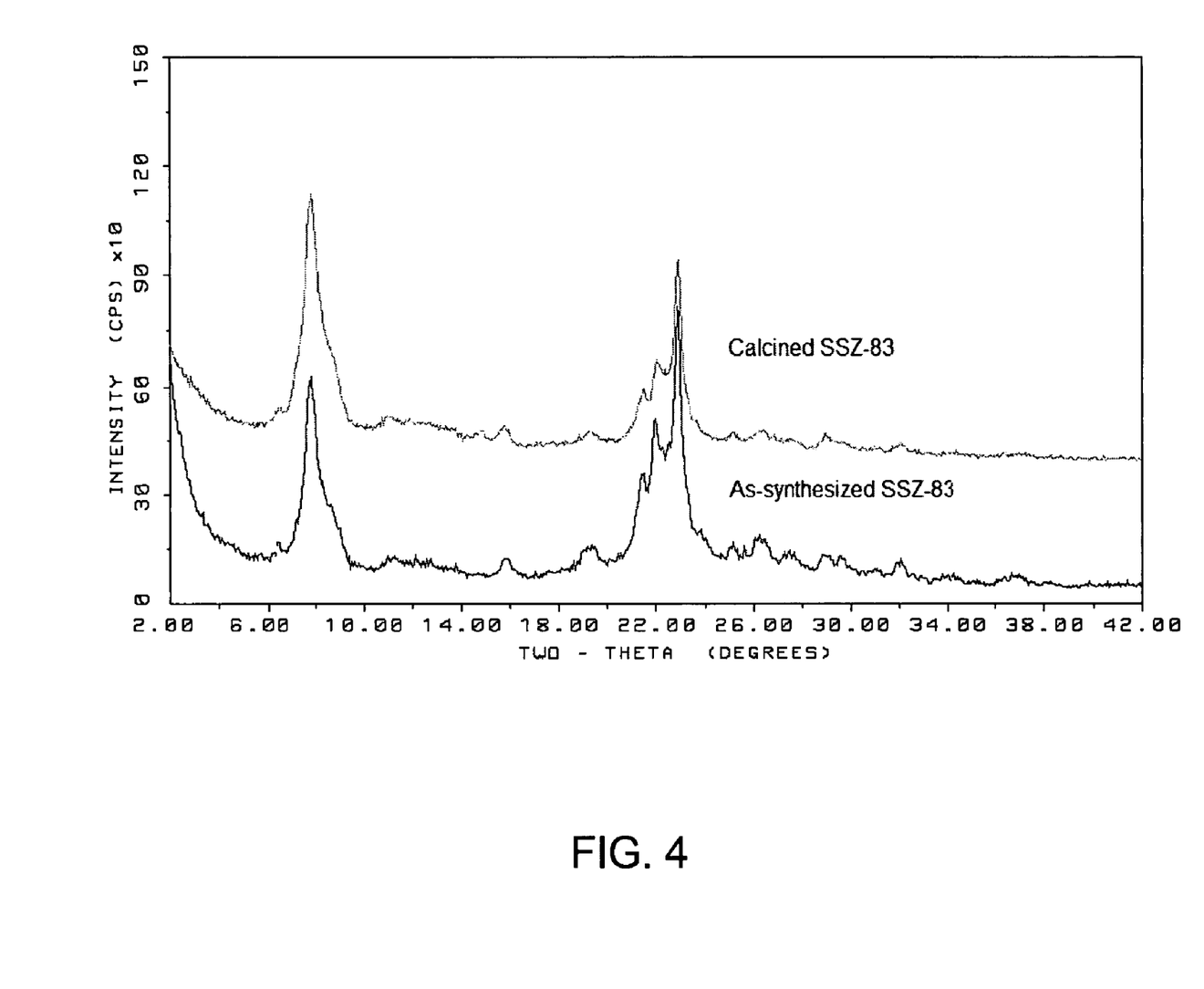
FIG. 4 shows the results of powder XRD analysis of the as-synthesized and calcined molecular sieve prepared in Example 6.

After 3 days, the $H_2O/SiO_2$ ratio of the gel was adjusted to 3.5 with the addition of the necessary quantity of water. 0.01 g of SSZ-83 seeds from Example 2 were then added to the gel. The Teflon liner was then capped and sealed within an 25 mL steel Parr autoclave. The autoclave was placed on a spit within a convection oven at 150° C. The autoclave was tumbled at 43 rpm over the course of 7 days in the heated oven. The autoclave was then removed and allowed to cool to room temperature. The solids were then recovered by filtration and washed thoroughly with deionized water (>250 mL). The solids were allowed to dry overnight at room temperature. The resulting product was analyzed by powder XRD. The resulting XRD pattern is shown in FIG. 4 (bottom pattern). Table 7 below shows the powder XRD lines for the resulting product.

TABLE 7

| 2 Theta$^{(a)}$ | d-spacing (Angstroms) | Relative Absolute Intensity (%) |
| --- | --- | --- |
| 6.53 | 13.53 | 3 |
| 7.87 | 11.22 | 71 |
| 8.66 | 10.20 | 23 |
| 11.34 | 7.80 | 2 |
| 15.88 | 5.58 | 7 |
| 19.41 | 4.57 | 9 |
| 21.43 | 4.14 | 28 |
| 21.99 | 4.04 | 53 |
| 22.90 | 3.88 | 100 |
| 23.58 | 3.77 | 2 |
| 26.12 | 3.41 | 14 |
| 26.46 | 3.37 | 14 |
| 27.52 | 3.24 | 11 |
| 28.86 | 3.09 | 12 |
| 29.56 | 3.02 | 12 |
| 30.94 | 2.89 | 7 |
| 31.98 | 2.80 | 9 |
| 34.00 | 2.63 | 5 |
| 36.90 | 2.43 | 7 |

$^{(a)}$±0.20

The resulting product was calcined inside a muffle furnace under a flow of 2% oxygen/98% nitrogen heated to 595° C. at a rate of 1° C./min and held at 595° C. for five hours, cooled and then analyzed by powder XRD. The resulting XRD pattern is shown in FIG. 4 (top pattern). Table 8 below shows the powder XRD lines for the calcined molecular sieve product.

TABLE 8

| 2 Theta$^{(a)}$ | d-spacing (Angstroms) | Relative Absolute Intensity (%) |
| --- | --- | --- |
| 6.51 | 13.57 | 4 |
| 7.90 | 11.18 | 100 |
| 8.69 | 10.17 | 36 |
| 11.14 | 7.93 | 2 |
| 13.40 | 6.60 | 2 |
| 14.78 | 5.99 | 4 |
| 15.74 | 5.63 | 10 |
| 19.26 | 4.61 | 6 |
| 21.46 | 4.14 | 21 |
| 22.14 | 4.01 | 39 |
| 22.89 | 3.88 | 78 |
| 23.53 | 3.78 | 5 |
| 25.15 | 3.54 | 2 |
| 26.34 | 3.38 | 5 |
| 27.61 | 3.23 | 3 |
| 29.01 | 3.08 | 5 |
| 29.64 | 3.01 | 2 |
| 32.07 | 2.79 | 4 |
| 34.29 | 2.61 | 1 |
| 36.39 | 2.47 | 1 |
| 37.05 | 2.42 | 2 |

$^{(a)}$±0.20

The XRD pattern indicates that the material remains stable after calcination to remove the organic SDA. A t-plot analysis of nitrogen physisorption data of the calcined product indicated a micropore volume of 0.20 cc/g and an external BET surface area of 245 m$^2$/g.

Example 7

Figure 5:
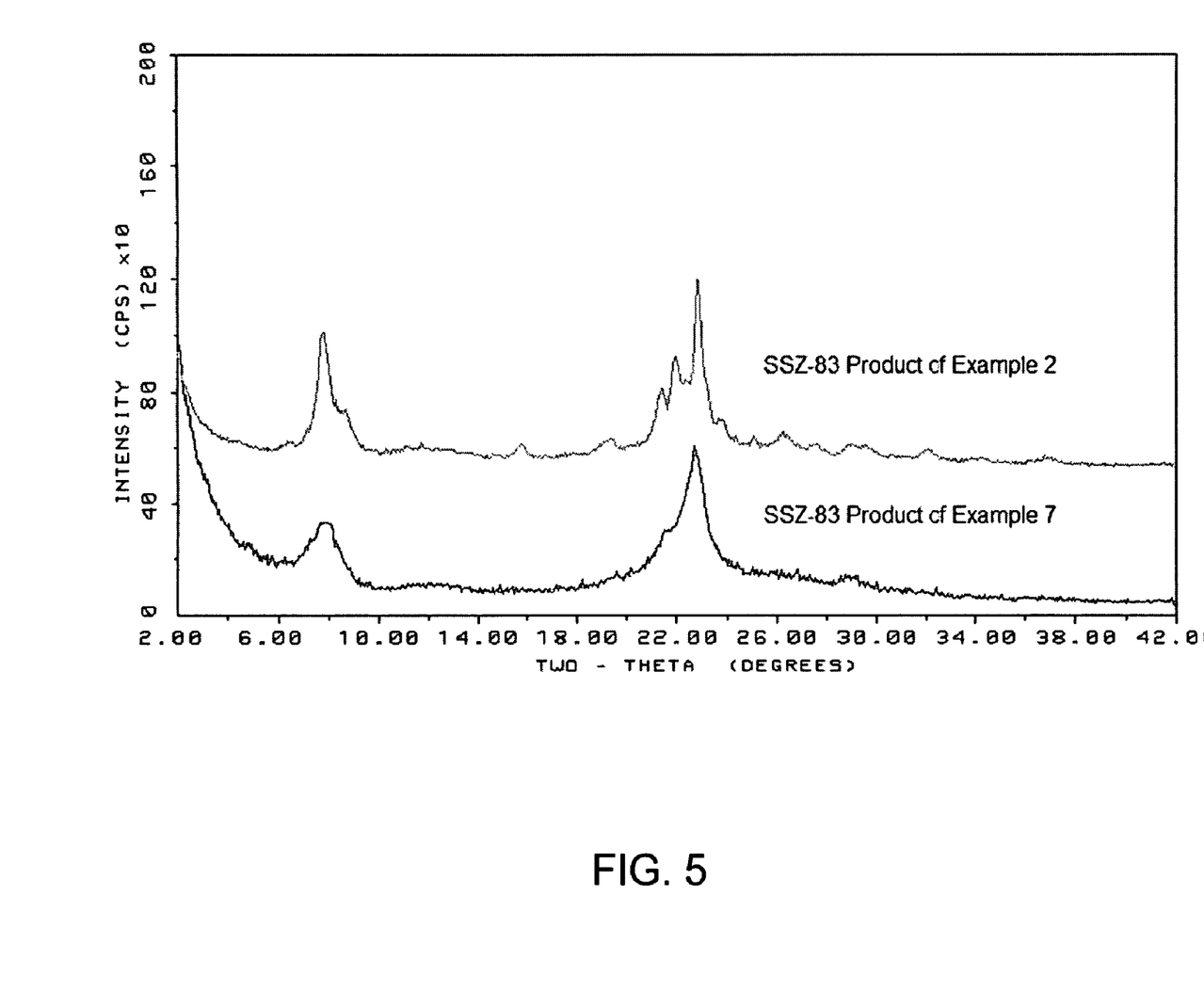
FIG. 5 shows the results of powder XRD analysis of the molecular sieves prepared in Examples 2 and 7.
Figure 6:
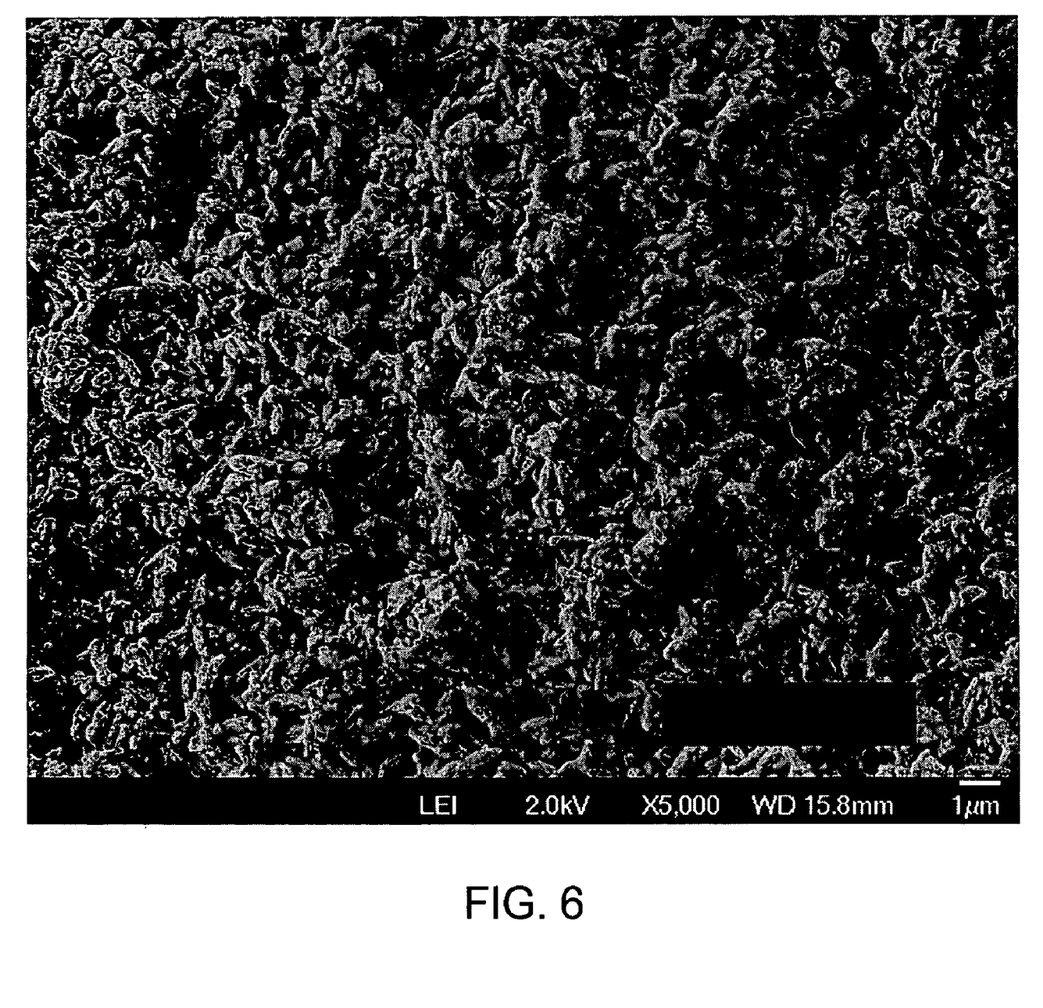
FIG. 6 shows the results of a SEM analysis of the molecular sieve prepared in Example 7.
Figure 7:
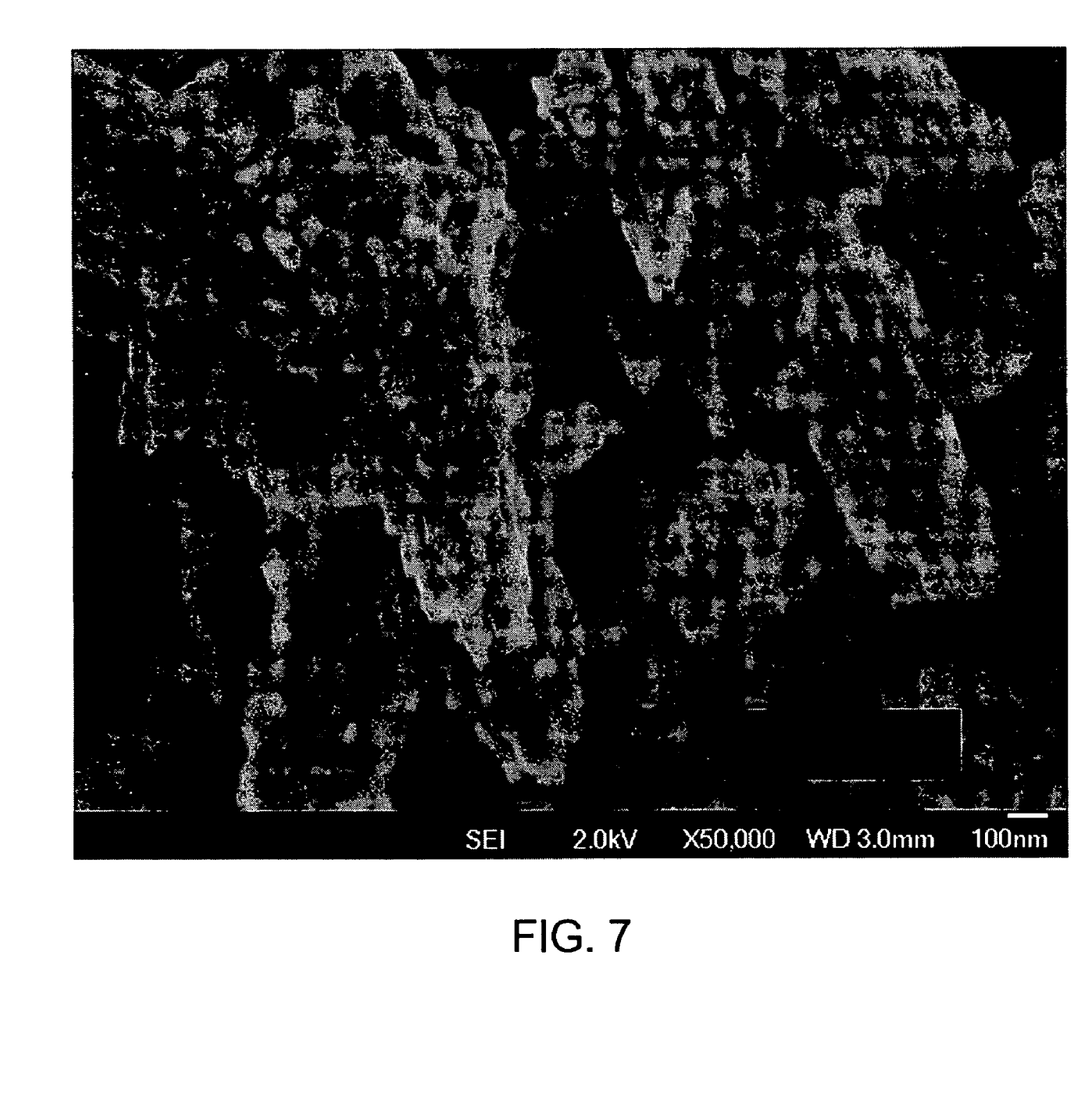
FIG. 7 also shows the results of SEM analysis of the molecular sieve prepared in Example 7.

The procedure from Example 6 was repeated except 0.033 g aluminum isopropoxide was added with the TEOS. The resulting product was analyzed by powder XRD and SEM. FIG. 5 shows the powder XRD pattern of the product of this Example (bottom pattern) compared with that for the SSZ-83 product from Example 2 (top pattern). FIGS. 6 and 7 show SEM images of the product.

Example 8

Example 7 was repeated except 0.05 g aluminum isopropoxide (instead of 0.033 g) were used in the gel preparation, and 0.06 g ammonium fluoride was added to the gel before being heated. The reaction was performed for 7 days at 150° C. The resulting product was analyzed by powder XRD, which showed the product to be SSZ-83, similar to that of Example 7. Elemental analysis by ICP-MS indicated the product has an Si/Al ratio of 15:1. CHN combustion analyses indicated the as-made product contained 12.9% C, 2.9% H, and 1.3% N.

Example 9

Synthesis of 1,4-bis(N-butylpyrrolidinium)butane Dication 9.14 g 1,4-dibromobutane and 12.16 g N-butylpyrrolidine (98%, Aldrich) were mixed with 150 mL acetone in a glass jar. The jar was then capped and sealed, and the reaction was allowed to proceed for 3 weeks at room temperature. The precipitated solids were then removed by filtration and rinsed with acetone and then ethyl ether. The solids were then dried in air. The product was shown to be pure within the detectable limits of 13C and 1H liquid NMR. The product was then exchanged into the hydroxide form by following a similar procedure described for the 1,4-bis(N-butylpiperidinium)butane in Example 1.

Synthesis of SSZ-83 Using 1,4-bis(N-butylpyrrolidinium)butane Dication

Example 10

5.74 g of a hydroxide solution of 1,4-bis(N-butylpyrrolidinium)butane ([OH$^-$]=0.57 mmol/g) were added to 1.35 g tetraethylorthosilicate (TEOS) in a tared Teflon container. The Teflon container was then capped, sealed, and placed within an 23-mL steel Parr autolcave. The autoclave was allowed to remain at room temperature overnight during which time the TEOS was allowed to hydrolyze. The Teflon cup was then removed from the autoclave and 0.13 g 50% HF was added and mixed to create a white viscous gel. The open Teflon container was then placed within a vented hood in order to allow the ethanol and water to evaporate.

After 4 days, the $H_2O/SiO_2$ ratio of the gel was adjusted to 3.5 with the addition of the necessary quantity of water. The Teflon liner was then capped and sealed within an 23 mL steel Parr autoclave. The autoclave was placed on a spit within a convection oven at 150° C. The autoclave was tumbled at 43 rpm over the course of 8 days in the heated oven. The autoclave was then removed and allowed to cool to room temperature. The solids were then recovered by filtration and washed thoroughly with deionized water (>250 mL). The solids were allowed to dry overnight at room temperature.

Figure 8:
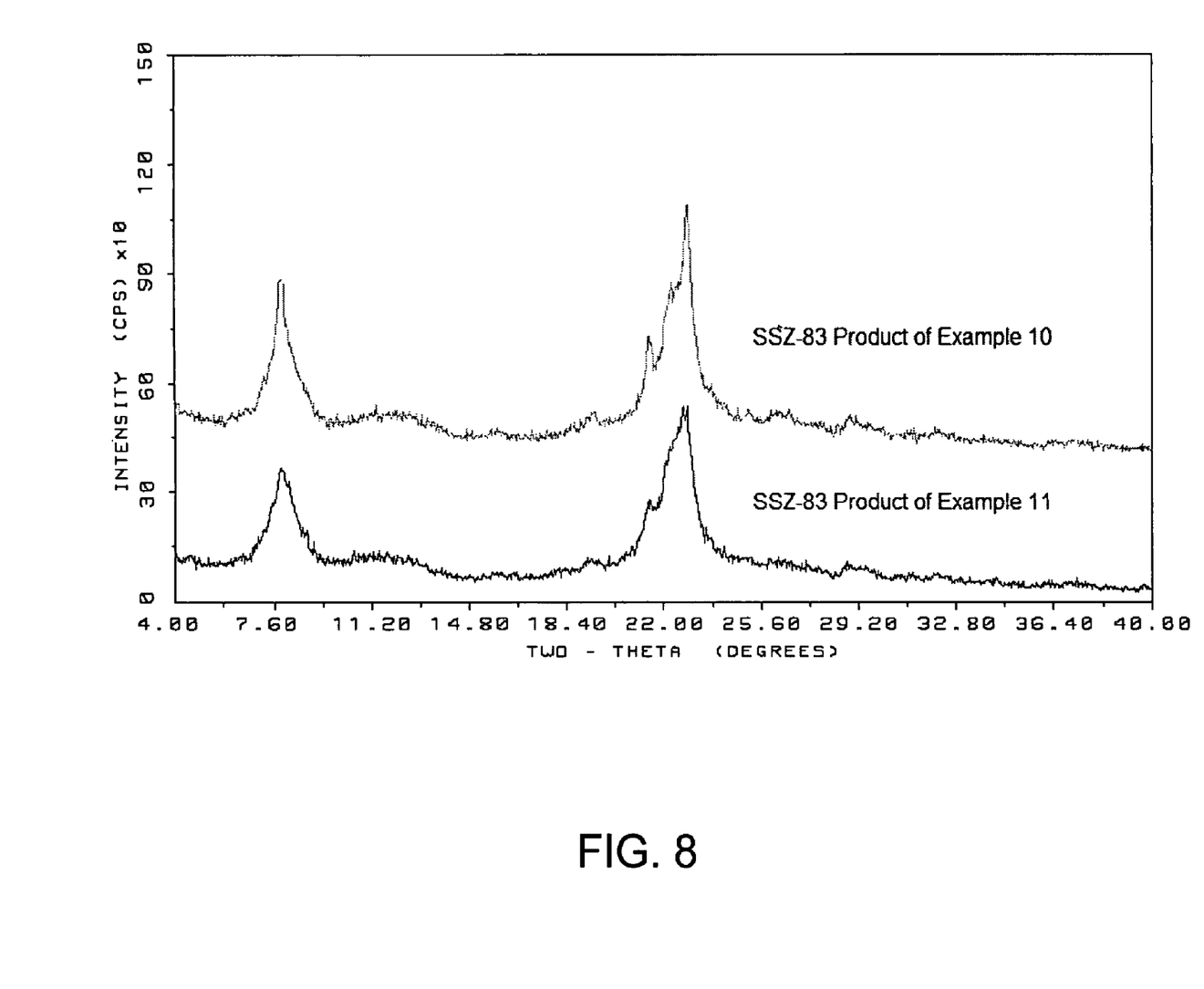
FIG. 8 shows the results of powder XRD analysis of the molecular sieves prepared in Examples 10 and 11.

The resulting product was analyzed by powder XRD. The resulting XRD pattern is shown in FIG. 8 (top pattern), which showed the product to be SSZ-83.

Example 11

The procedure from Example 10 was followed except that the final $H_2O/SiO_2$ ratio was adjusted to 2.0 rather than to 3.5 and the reaction was heated for 7 days rather than for 8 days. The resulting XRD pattern is shown in FIG. 8 (bottom pattern), which was similar to that of Example 10, except several of the peaks were broader than the peaks in the pattern from Example 10.

Example 12

0.02 g of F-2000 aluminum hydroxide (Reheis, Inc.) was dissolved in 11.48 g of a hydroxide solution of 1,4-bis(N-butylpyrrolidinium)butane ([OH$^-$]=0.57 mmol/g) in a tared Teflon container. 2.70 g of TEOS was then added to the solution. The Teflon container was then capped, sealed, and placed within an 23-mL steel Parr autolcave. The autoclave was allowed to remain at room temperature overnight during which time the TEOS was allowed to hydrolyze. The Teflon cup was then removed from the autoclave and 0.26 g 50% HF was added and mixed to create a white viscous gel. The open Teflon container was then placed within a vented hood in order to allow the ethanol and water to evaporate. After a week, the $H_2O/SiO_2$ ratio of the gel was adjusted to 3.5 with the addition of the necessary quantity of water. The Teflon liner was then capped and sealed within an 23 mL steel Parr autoclave. The autoclave was placed on a spit within a convection oven at 150° C. The autoclave was tumbled at 43 rpm over the course of 7 days in the heated oven. The autoclave was then removed and allowed to cool to room temperature. The solids were then recovered by filtration and washed thoroughly with deionized water (>250 mL). The resulting product was analyzed by powder XRD, which showed the product to be SSZ-83.

Synthesis of B-SSZ-83 Using 1,4-bis(N-butylpiperidinium)butane Dication

Example 13

0.013 g boric acid was dissolved in 4.53 g of a hydroxide solution of 1,4-bis(N-butylpiperidinium)butane ([OH$^-$]= 0.72 mmol/g) in a tared Teflon container. 1.35 g tetraethylorthosilicate (TEOS) was then added to the solution. The Teflon container was then capped, sealed, and placed within an 23-mL steel Parr autolcave. The autoclave was allowed to remain at room temperature overnight during which time the TEOS was allowed to hydrolyze. The Teflon cup was then removed from the autoclave and 0.13 g 50% HF was added and mixed to create a white viscous gel. The open Teflon container was then placed within a vented hood in order to allow the ethanol and water to evaporate. After 4 days, the $H_2O/SiO_2$ ratio of the gel was adjusted to 3.5 with the addition of the necessary quantity of water and 0.02 g of SSZ-83 seeds were added. The Teflon liner was then capped and sealed within an 23 mL steel Parr autoclave. The autoclave was placed on a spit within a convection oven at 150° C. The autoclave was tumbled at 43 rpm over the course of 8 days in the heated oven. The autoclave was then removed and allowed to cool to room temperature. The solids were then recovered by filtration and washed thoroughly with deionized water (>250 mL). The solids were allowed to dry overnight at room temperature. Powder XRD showed the product to be SSZ-83 with a broad powder XRD pattern.

What is claimed is:

1. A method for preparing a molecular sieve comprising contacting under crystallization conditions: (1) at least one source of an oxide of a first tetravalent element; (2) optionally, one or more sources of an oxide selected from the group consisting of oxides of a trivalent element, a pentavalent element, a second tetravalent element which is different from the first tetravalent element, and mixtures thereof; (3) fluoride ions; and (4) a structure directing agent selected from the group consisting of 1,4-bis(N-butylpiperidinium)butane dications and 1,4-bis(N-butylpyrrolidinium)butane dications.

2. The method of claim 1, wherein the molecular sieve is prepared from a reaction mixture comprising, in terms of mole ratios, the following:

| | |
|---|---|
| $YO_2/W_aO_b$ | 20-∞ |
| $Q/YO_2$ | 0.1-1.0 |
| $F/YO_2$ | 0.2-1.5 |
| $H_2O/YO_2$ | 1-7 | wherein:
(1) Y is selected from the group consisting of tetravalent elements from Groups 4-14 of the Periodic Table, and mixtures thereof;
(2) W is selected from the group consisting of trivalent, pentavalent and tetravalent elements from Groups 3-13 of the Periodic Table, and mixtures thereof;
(3) a is 1 or 2, and b is 2 when a is 1 or bis 3 or 5 when a is 2; and (4) Q is a SDA dication selected from the group consisting of 1,4-bis(N-butylpiperidinium)butane dications and 1,4-bis(N-butylpyrrolidinium)butane dications.

3. The method of claim 2, wherein Y is selected from the group consisting of Ge, Si, and mixtures thereof.

4. The method of claim 3, wherein Y is Si.

5. The method of claim 3, wherein W is selected from the group consisting of Ga, Al, Fe, B, Ti, In, and mixtures thereof.

6. The method of claim 5, wherein W is selected from the group consisting of Al, B, Fe, Ga, and mixtures thereof.

7. The method of claim 2, wherein W is selected from the group consisting of Ga, Al, Fe, B, Ti, In, and mixtures thereof.

8. The method of claim 7, wherein W is selected from the group consisting of Al, B, Fe, Ga, and mixtures thereof.

9. The method of claim 2, wherein Y is Si and W is B.

10. The method of claim 2, wherein the molecular sieve is prepared from a reaction mixture comprising, in terms of mole ratios, the following:

| | |
|---|---|
| $YO_2/W_aO_b$ | 30-∞ |
| $Q/YO_2$ | 0.15-0.30 |
| $F/YO_2$ | 0.3-0.6 |
| $H_2O/YO_2$ | 2-4. |

11. The method of claim 1, wherein the a structure directing agent is a 1,4-bis (N-butylpiperidinium)butane dication.

12. The method of claim 1, wherein the a structure directing agent is a 1,4-bis (N-butylpyrrolidinium)butane dication.

13. The method of claim 1, wherein the molecular sieve has, after calcination, an X-ray diffraction pattern substantially as shown in the following Table:

| 2 Theta | d-spacing (Angstroms) | Relative Absolute Intensity (%) |
|---|---|---|
| 7.90 ± 0.2 | 11.18 | VS |
| 8.69 ± 0.2 | 10.17 | M |
| 15.74 ± 0.2 | 5.63 | W |
| 19.26 ± 0.2 | 4.61 | W |
| 21.46 ± 0.2 | 4.14 | M |
| 22.14 ± 0.2 | 4.01 | M |
| 22.89 ± 0.2 | 3.88 | VS |
| 26.34 ± 0.2 | 3.38 | W |
| 29.01 ± 0.2 | 3.08 | W. |

14. The method of claim 1, wherein the molecular sieve has a composition, as-synthesized and in the anhydrous state, in terms of mole ratios, as follows:

| | |
|---|---|
| $YO_2/W_cO_d$ | 20-∞ |
| $Q/YO_2$ | 0.015-0.06 | wherein c is 1 or 2, and d is 2 when c is 1 or d is 3 or 5 when c is 2.

* * * * *